Patented Nov. 8, 1927.

1,648,760

UNITED STATES PATENT OFFICE.

FERDINAND DIETZSCH, OF KINGSTON-ON-THAMES, ENGLAND.

TREATMENT OF ORES FOR THE EXTRACTION OF VALUES.

No Drawing. Original application filed January 16, 1924, Serial No. 686,673. Divided and this application filed May 8, 1925, Serial No. 28,970, and in Belgium October 25, 1923.

In United States Letters Patent No. 1,553,223 of September 8, 1925 (application Serial No. 686,673, filed 16th January 1924, of which application the present application is a division) I have described the use of a solution of high chlorine ion concentration containing sulphurous acid for treating oxidized or roasted copper ores for extracting metal values.

The present invention relates to the application of this reagent to a method of treating gold and silver ores containing admixtures of base metals, the presence of which leads, in the usual extraction of the precious metals by means of cyanide or thiosulphate, to a high consumption of these reagents.

The invention is mainly applicable to the removal of copper contents from the ores, but in a general way, it is applicable to the removal or destruction of cyanicides even other than copper compounds, particularly manganese compounds.

The invention comprises a treatment of oxidized or roasted gold and silver ores containing admixtures of the kind hereinbefore referred to, with a strong solution of a metallic chloride, preferably an alkali chloride, in presence of sulphurous acid, preparatory to the treatment for extracting the precious metal values. By the preliminary treatment, cyanicides are removed, and the residual ore can then be cheaply treated with cyanide or thiosulphate to leach out the precious metals.

In some cases, the preparatory or preliminary treatment may be improved, as is hereinafter described, by the presence of a suitable oxidizing agent.

The following example illustrates the method. A cupriferous gold-silver ore consisting of a mixture of oxides, carbonates and silicates of copper together with sulphides of silver and copper and free gold and silver, which assayed 13.43 per cent. of copper, 102.14 grams of silver and 37.86 grams of gold per metric ton, was crushed through a No. 20 mesh sieve. A quantity of the ore was first treated with a cyanide solution for the extraction of the gold and silver values, but in spite of all the usual remedies applied, the consumption of cyanide was extremely high, viz, 5.65 kilos per ton of ore. Another quantity of the ore was next leached for the preliminary extraction of the oxidized copper minerals with eight times its weight of a saturated solution of sodium chloride which had been saturated with $SO_2$. After giving the ore an alkaline wash, it was next treated with a cyanide solution.

The following extractions were obtained: 51.20 per cent of the total copper and 61.43 per cent of the gold and silver values. The consumption of the cyanide now proved to be better, namely 1.7 kilos per ton of ore.

Another quantity of the ore was subjected to a roast to eliminate the sulphur from the sulphides and was next leached with eight times its weight of a saturated solution of chloride of sodium, which had been saturated with $SO_2$. After giving the ore an alkaline wash, it was treated with cyanide. The extractions in this case were 89.10 per cent of copper and 82.60 per cent of gold and silver values, with a consumption of even less cyanide, viz, 0.95 kilo per ton of ore.

In the case of argentiferous copper ores a saturated common salt solution more or less charged with $SO_2$ dissolved considerable proportions of the silver values in addition to those of copper. For instance, in the case of a certain oxidized argentiferous copper ore this extraction of silver amounted to 60.87 per cent of the total silver contents, which was obtained by the same leaching which removed 88.89 per cent of the total copper values. This clearly demonstrates the fact that there was chlorination of some of the silver minerals, for only the chloride of silver is soluble in a saturated common salt solution.

Very low grade silver ores, needing the cheapest possible treatment, will yield very fair extractions without any additional solvent, by simply leaching them with a saturated common salt solution which has been saturated with sulphurous acid.

The suitably crushed ore is mixed with an oxidizing agent, of which a few pounds per ton generally suffice, preferably with a permanganate or manganese dioxide and then treated with a saturated alkali chloride solution which has also been saturated with sulphurous anhydride. This solution chloridizes the metallic oxides present. The reactions occur in the cold but are very much accelerated by raising the temperature.

Small proportions of alkali nitrates instead of the manganese compound produces similar, but not such pronounced effects, while bleaching powder yields good results.

The chloridizing solution is allowed to percolate for some time through the crushed ore, and after a wash with water to remove any sulphurous acid, chlorine, acid sulphate of sodium, manganic chloride and other base metal chlorides, the ores are ready to be leached with the usual solvent solutions of the cyanides and the thiosulphates for the recovery of the remaining gold and silver values.

In the case of argentiferous ores the saturated chloride solution will be found likewise to have dissolved considerable quantities of silver proving that some of the silver has been converted into chloride. The silver chloride contained in the saturated chloride solution can be recovered by precipitation on copper, or by diluting the solution with water the silver chloride can be deposited on wood shavings.

In a measure the dissolving effect of the saturated chloride solution on the silver relieves the work to be done by the subsequently applied solvent solutions, but as this involves a double precipitation, it is frequently preferable to reduce the strength of the chloride solution, so that it may not dissolve any silver values.

The removal by this method of the base metal oxides that consume cyanide and thiosulphate makes it possible to leach economically ores which could not otherwise be profitably treated. It has been ascertained that the total extraction of the silver contents of an ore is also considerably increased by this method.

When the oxidizing agent used is chlorine the chloride solution containing sulphurous acid constitutes a useful agent for chloridizing gold and silver ores for extraction of metal values. Thus a concentrated salt solution may be more or less saturated with chlorine and sulphur dioxide and used as a liquor for leaching the ore.

Having thus fully described the nature of the said invention and the best means I know of carrying the same into practical effect, I claim:—

1. A process for treating oxidized or roasted gold and silver ores containing admixture of base metals destructive of solvents for gold and silver, which process comprises a preliminary treatment of the ore with a strong solution of a metallic chloride, containing sulphurous acid.

2. A process for treating oxidized or roasted gold and silver ores containing admixtures of base metals destructive of solvents for gold and silver, which process comprises a preliminary treatment of the ore with a strong solution of an alkali chloride, containing sulphurous acid.

3. A process for treating oxidized or roasted gold and silver ores containing admixtures of base metals destructive of solvents for gold and silver, which process comprises a preliminary treatment of the ore with an oxidizing agent and a strong solution of a metallic chloride, containing sulphurous acid.

4. A process for treating oxidized or roasted gold and silver ores containing admixtures of base metals destructive of solvents for gold and silver, which process comprises a preliminary treatment of the ore with an oxidizing agent and a strong solution of an alkali chloride, containing sulphurous acid.

5. In a process for treating oxidized or roasted gold and silver ores containing admixtures of base metals destructive of solvents for gold and silver, a preliminary treatment which comprises mixing the crushed ore with an oxidizing agent and treating the mixture with a strong solution of a metallic chloride containing sulphur dioxide.

6. In a process for treating oxidized or roasted gold and silver ores containing admixtures of base metals destructive of solvents for gold and silver, a preliminary treatment which comprises mixing the crushed ore with an oxidizing agent and treating the mixture with a strong solution of an alkali chloride containing sulphur dioxide.

7. In a process for treating oxidized or roasted gold and silver ores containing admixtures of base metals destructive of solvents for gold and silver, a preliminary treatment which comprises mixing the crushed ore with an oxidizing agent and treating the mixture with a strong solution of an alkali chloride saturated with sulphur dioxide.

8. In a process for treating oxidized or roasted gold and silver ores containing admixtures of base metals destructive of solvents for gold and silver, a preliminary treatment which comprises mixing the crushed ore with bleaching powder and treating the mixture with a strong solution of a metallic chloride containing sulphurous acid.

9. In a process for treating oxidized or roasted gold and silver ores containing admixtures of base metals destructive of solvents for gold and silver, a preliminary treatment which comprises mixing the crushed ore with bleaching powder and treating the mixture with a strong solution of an alkali chloride containing sulphurous acid.

In testimony whereof I have signed my name to this specification.

FERDINAND DIETZSCH.